PHASE-SHIFT OSCILLATOR

Filed March 4, 1954

2 Sheets-Sheet 1

INVENTOR
BENJAMIN F. SPENCER
BY
Thomas M. Ferrill, Jr.
ATTORNEY

Jan. 15, 1957 B. F. SPENCER 2,777,952

PHASE-SHIFT OSCILLATOR

Filed March 4, 1954 2 Sheets-Sheet 2

INVENTOR
BENJAMIN F. SPENCER
BY
Thomas McFerrill, Jr.
ATTORNEY

United States Patent Office 2,777,952

Patented Jan. 15, 1957

2,777,952

PHASE-SHIFT OSCILLATOR

Benjamin F. Spencer, Malverne, N. Y., assignor to Sperry Rand Corporation, a corporation of Delaware Application March 4, 1954, Serial No. 414,021

11 Claims. (Cl. 250—36)

The present invention relates to oscillators utilizing resistor-reactor phase-shift networks.

Heretofore the plate to grid feedback circuit of phase-shift oscillators of the type utilizing a resistor-reactor phase-shift network has always been comprised of three or more resistor-reactor phase-shift sections or an equivalent network for providing a total phase angle of 180 degrees between the plate-cathode and grid-cathode oscillator voltages, a condition necessary to sustain oscillations. Three or more sections or their equivalent are required because a single phase-shift section consisting of a resistor and a reactor (either an inductor or a capacitor) cannot provide as much as a 90 degree phase shift and still develop a useful output voltage. This is well known in the art.

In phase-shift oscillators of the prior art means are provided to maintain the cathode of the amplifier tube thereof at a positive direct current potential with respect to its grid while maintaining the cathode effectively at ground potential for oscillator voltages. Usually this is done by providing a resistor and a large bypass capacitor thereacross between ground and the cathode of the tube.

In an arrangement as aforedescribed the capacitor has a negligible value of reactance which is very low compared to the resistance value of the resistor in parallel therewith for the oscillator current. Thus, there is substantially no oscillator voltage drop produced between the cathode of the amplifier tube and ground, and the 180 degree phase angle between the grid-cathode and plate-cathode oscillator voltages must be attained by virtue of a phase-shift network in the plate to grid circuit of the amplifier tube. It has been discovered that such an oscillator utilizes an unnecessary number of circuit elements and requires more gain than is really essential for sustaining oscillations.

It is an object of the present invention to provide a phase-shift oscillator which is comprised of a minimized number of circuits elements.

It is a further object of the present invention to provide a phase-shift oscillator requiring a minimum of gain.

It is another object of the present invention to provide a phase-shift oscillator utilizing a phase-shift network in the plate circuit of the amplifier tube thereof which provides appreciably less than 180 degrees of phase shift between plate-ground and grid-ground oscillator voltages.

It is a further object of the present invention to provide a simplified phase-shift oscillator having good frequency stability.

The foregoing objects and other advantages of the present invention which will become apparent to those skilled in the art are attained by utilizing a resistor-reactor phase-shift network in the plate circuit of an amplifier tube for providing appreciably less than 180 degrees of phase difference between plate-ground and grid-ground oscillator voltages. Reactance means having a proper value of reactance at the oscillator frequency is utilized in the cathode circuit of the tube to provide an oscillator voltage drop of predetermined magnitude and phase angle thereacross. The required overall phase shift between the plate-cathode and grid-cathode oscillator voltages is attained by virtue of the phase shift provided by the aforementioned phase-shift network and a further phase shift of predetermined value in the cathode circuit of the amplifier tube by virtue of the aforementioned reactance means therein.

Figure 1:
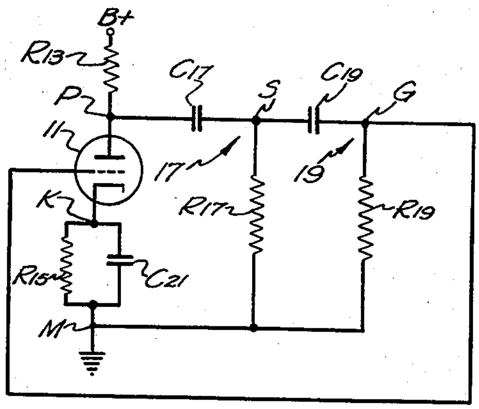
Fig. 1 is a schematic diagram of an oscillator in accordance with a preferred embodiment of the present invention.

Referring to Fig. 1, numeral 11 designates a conventional triode vacuum tube amplifier having a B+ direct current voltage supply coupled to its anode or plate through a load resistor $R_{13}$. A resistor $R_{15}$ is connected between the cathode of tube 11 and ground to maintain the direct current potential of the cathode suitably positive with respect to the grid potential.

A resistor-reactor phase-shift network comprising two L-section phase-shift stages 17 and 19 is connected between the plate and grid of tube 11. The phase-shift network has an input terminal at point P for connection to the plate of tube 11, an output terminal at point G for connection to the grid of tube 11, and a ground terminal at M for connection to ground as illustrated. Phase-shift stage 17 includes a series capacitor $C_{17}$ and a shunt resistor $R_{17}$. Stage 19 includes a series capacitor $C_{19}$ and a shunt resistor $R_{19}$. The input impedance of the L-section phase-shift stage 19 is made appreciably larger than the input impedance of the previous stage 17 so that the loading on stage 17 will be minimized. This reduces oscillator voltage attenuation through the phase-shift network as taught in the article entitled "Extending the frequency range of the phase-shift oscillator," in the volume 33, 1945 Proceedings of the I. R. E., pages 597 and 598, for example.

A capacitor $C_{21}$ is connected across the resistor $R_{15}$ in the cathode circuit between the cathode of tube 11 and ground. Capacitor $C_{21}$ is chosen to have a predetermined value of reactance at the oscillator frequency to provide an oscillator voltage drop of suitable magnitude and phase angle between the cathode of tube 11 at point K and ground.

Figure 2:
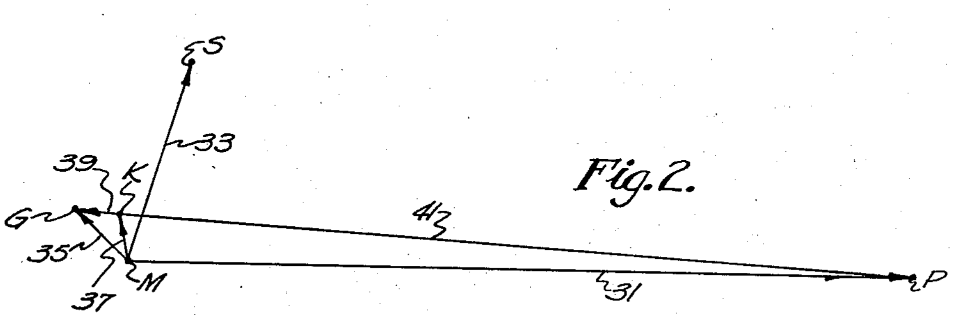
Fig. 2 is a vector diagram representing oscillator voltages and the relative phases thereof at various points in the oscillator of Fig. 1.

Referring to Figs. 1 and 2, the oscillator voltage between the plate of tube 11 at point P and ground at point M is indicated in Fig. 2 by vector 31. This voltage is applied across the first L-section phase-shift stage 17 where it is advanced in phase (due to the capacitive reactance of $C_{17}$) and attenuated. The amount of phase shift is dependent on the relative values of capacitor $C_{17}$ and resistor $R_{17}$, and is made appreciably less than 90 degrees to reduce attenuation. The amount of attenuation is dependent on the phase shift provided by phase-shift stage 17 and the loading of stage 17 by stage 19, the larger the phase shift and/or loading, the greater the attenuation.

The oscillator voltage at the output of the first phase-shift stage 17 across the resistor $R_{17}$ between point S and ground is designated by vector 33 in Fig. 2. The voltage represented by vector 33 is also shifted in phase (advanced) and attenuated by the L-section phase-shift stage 19. The resultant oscillator voltage at the output of stage 19 appears across resistor $R_{19}$ between the grid of tube 11 at point G and ground, and is designated by vector 35 in Fig. 2. The phase shift provided by the second L-section phase-shift stage 19 is also less than 90 degrees. Therefore, the phase angle between the plate-ground and grid-ground oscillator voltages is appreciably less than 180 degrees, and is seen by comparing the phases of the voltage vectors 31 and 35.

The oscillating component of the plate current of tube 11 flows through the resistor $R_{15}$ and the capacitor $C_{21}$. Thus, an oscillator voltage drop is produced between the cathode of tube 11 at point K and ground which has a predetermined magnitude and phase angle as indicated by vector 37 in Fig. 2.

The capacitive reactance means $C_{21}$ in the cathode circuit of tube 11 causes the component of the oscillator voltage from the grid to the cathode of tube 11 to lead the applied grid-ground voltage represented by vector 35. This leading voltage is represented by vector 39, which vector corresponds to the vector difference between the grid-ground voltage vector 35 and the cathode-ground voltage vector 37.

The oscillator voltage between the plate and cathode of tube 11 is the vector difference between the oscillator voltage between the cathode and ground (vector 37) and the oscillator voltage between plate and ground (vector 31), and is designated by vector 41. Vector 41 extends between point K and point P in Fig. 2. Therefore, the grid-cathode oscillator voltage indicated by vector 39 is 180 degrees out of phase with the plate-cathode oscillator voltage indicated by vector 41, one of the required conditions for sustaining oscillations.

If the gain of amplifier tube 11 is sufficient to overcome circuit losses, sinusoidal oscillations will be sustained in the arrangement shown in Fig. 1 even though only two phase-shift sections are employed in the plate to grid feedback circuit of the oscillator. A reduction in circuit elements is effected as compared to prior art oscillators because a third required phase shift can be and is attained in the cathode circuit of the oscillator by virtue of the capacitor reactance means therein.

Circuit losses in the oscillator of Fig. 1 are kept to a minimum because voltage attenuation in the plate to grid feedback path of the oscillator is minimized. Voltage attenuation is minimized because the oscillator voltage at the plate of tube 11 is fed back through only two rather than three or more phase-shift sections or their equivalent as in resistor-reactor phase-shift oscillators heretofore known in the art. Furthermore, for stable operation to be maintained, the input impedance of the oscillator feedback path in parallel with the plate and load resistances of tube 11 can readily be made high because the input impedance of only one phase-shift section 19 loads the phase-shift section 17.

In an oscillator which has been constructed in accordance with Fig. 1 of the present invention, utilizing one section of a twin triode 12AX7 vacuum tube amplifier to produce and sustain oscillations at approximately 250 cycles per second, the circuit components thereof had the following values:

| | |
|---|---|
| $R_{13}$ | 150,000 ohms. |
| $R_{15}$ | 20,000 ohms. |
| $R_{17}$ | 470,000 ohms. |
| $R_{19}$ | 1,000,000 ohms. |
| $C_{17}$ | 400 micro-microfarads. |
| $C_{19}$ | 100 micro-microfarads. |
| $C_{21}$ | 0.1 microfarad. |

In such an oscillator it was found that a variation in B+ voltage from +180 volts to +320 volts caused a frequency variation of only one cycle per second, thus indicating very good frequency stability.

Figure 3:
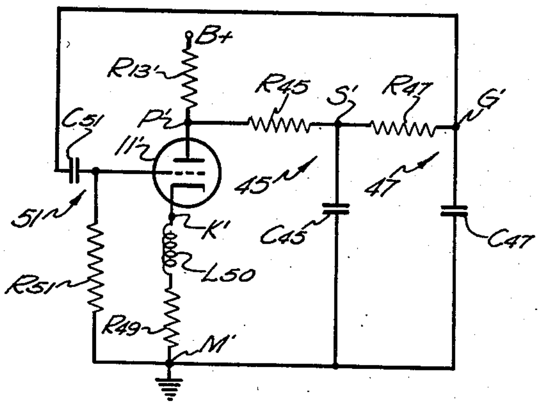
Fig. 3 is a schematic diagram of a further embodiment of an oscillator in accordance with the present invention.

An alternative embodiment of the present invention is illustrated in Fig. 3. In this embodiment the plate to grid feedback circuit of a vacuum tube amplifier 11' includes a resistor-reactor phase-shift network comprising two resistor-capacitor L-section phase-shift stages 45 and 47 connected in tandem, with resistors $R_{45}$ and $R_{47}$ thereof, respectively, being connected in series. The input terminal of the phase-shift network at point P' is connected to the plate of tube 11', the output terminal at G' is coupled to the grid through a coupling network 51, and a ground terminal M' of the network is connected to ground as illustrated. Stages 45 and 47 are adapted to produce an overall phase lag of the plate or anode oscillator voltage. This occurs because the outputs of these phase-shift stages are derived across shunt capacitors $C_{45}$ and $C_{47}$, respectively.

The plate of tube 11' is coupled to a source of positive operating potential through a load resistor $R_{13}'$. A resistor $R_{49}$ is provided in the cathode circuit of tube 11' to maintain the cathode positively biased with respect to the grid. An inductor $L_{50}$ is also provided in the cathode circuit of tube 11' in series with resistor $R_{49}$ for providing a reactive oscillator voltage drop of predetermined magnitude and phase angle thereacross.

Figure 4:
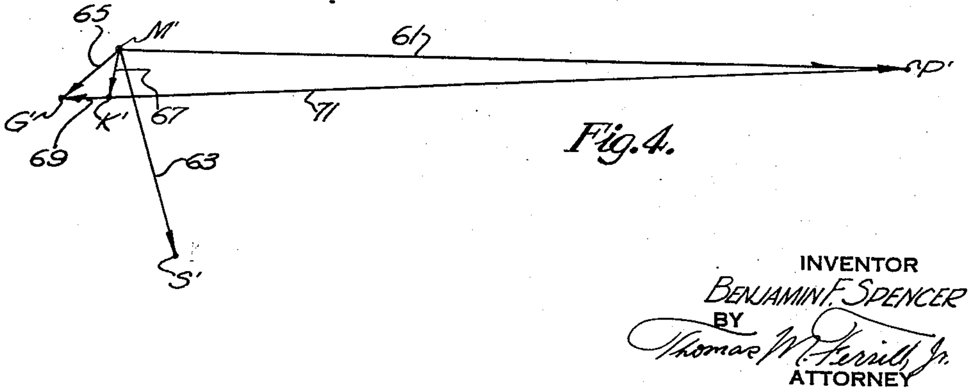
Fig. 4 is a vector diagram representing oscillator voltages and the relative phases thereof at various points in the oscillator of Fig. 3.

In the operation of the embodiment of Fig. 3, the oscillator voltage between the plate of tube 11' at point P' and ground at point M' is indicated by the vector 61 in Fig. 4. Because of the action of the resistor-capacitor L-section phase-shift stage 45 this voltage is attenuated and shifted in phase in a lagging direction to become a voltage vector having a relative magnitude and phase as illustrated by vector 63 in Fig. 4. Voltage vector 63 represents the voltage across capacitor $C_{45}$ between point S' and ground.

The output voltage from stage 45 is applied across the input terminals of phase-shift stage 47. Stage 47 also produces an output voltage which is attenuated and lags the phase of its input voltage as indicated by vector 65 in Fig. 4. The voltage designated by vector 65 is supplied to the grid of tube 11' through the coupling network 51 so that, if capacitor $C_{51}$ and resistor $R_{51}$ are properly chosen, the grid-ground voltage of tube 11' is substantially in phase with and of the same magnitude as the voltage represented by vector 65.

The plate current in the cathode circuit of tube 11' produces an oscillator voltage drop between the cathode of tube 11' and ground. This voltage drop will lead the applied grid-ground oscillator voltage represented by vector 65 because of the presence of inductor $L_{50}$. The oscillator voltage at the cathode of tube 11' between point K' and ground is indicated by vector 67 in Fig. 4.

Vector 69 between the points G' and K' in Fig. 4 represents the grid-cathode resultant oscillator voltage of tube 11'. The grid-cathode voltage indicated by vector 69 and the plate-cathode voltage indicated by vector 71 are 180 degrees out of phase at the oscillator frequency so that oscillations will be sustained.

Figure 5:
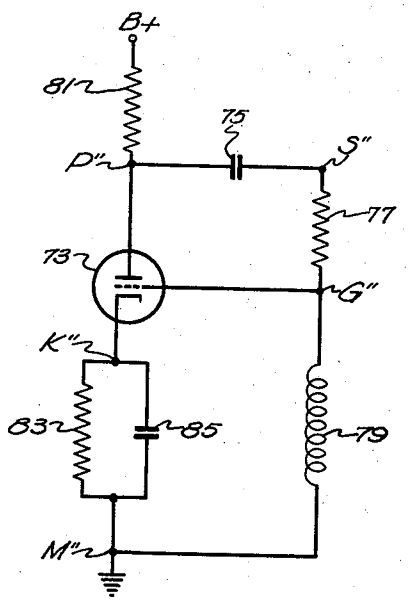
Fig. 5 is a schematic diagram of a further embodiment utilizing the principles of the present invention.

A further oscillator embodiment utilizing the principles of the present invention is illustrated in Fig. 5. In this embodiment, instead of utilizing a phase-shift network comprising two resistor-capacitor phase-shift sections between the plate and grid of the amplifier tube, a phase-shift network comprising a capacitor, a resistor and an inductor is utilized in the plate circuit of the tube for providing greater than 90 degrees but appreciably less than 180 degrees of phase difference between plate-ground and grid-ground oscillator voltages.

Referring to Fig. 5, the plate circuit of an amplifier tube 73 includes a phase-shift network comprising a capacitor 75, a resistor 77 and an inductor 79 connected in series with each other. The phase shift network has an input terminal at P'' connected to the plate of tube 73, an output terminal at G'' connected to the grid of tube 73, and a ground terminal at M'' connected to ground as illustrated. The capacitor 75 is chosen to have a larger value of reactance than inductor 79 at the oscillator frequency so that the oscillator current through the phase-shift network will lead the applied plate-ground oscillator voltage.

The plate of tube 73 is coupled to a source of positive potential through a load resistor 81. A resistor 83 is connected between the cathode of tube 73 and ground for biasing purposes. A reactance means comprising a capacitor 85 is connected across resistor 83 for providing an oscillator voltage drop of predetermined magnitude and phase angle between the cathode of tube 73 at point K'' and ground.

Figure 6:
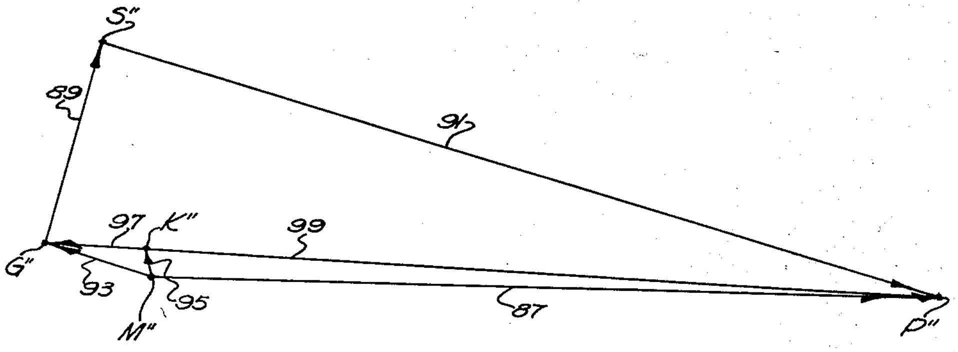
Fig. 6 is a vector diagram of oscillator voltages in the embodiment of Fig. 5.

The operation of the arrangement shown in Fig. 5 is best described by referring to Fig. 6. The oscillator voltage between point P'' and ground at point M'' in Fig. 5 is designated by vector 87 in Fig. 6. Since the phase-shift network comprising capacitor 75, resistor 77, and inductor 79 has more capacitive than inductive reactance at the oscillator frequency, the oscillator current through the phase-shift network leads the applied voltage 87.

The leading current through the phase-shift network produces a voltage drop across resistor 77 as indicated by voltage vector 89 in Fig. 6. A voltage drop as represented by vector 91 is produced across capacitor 75 which lags the voltage across resistor 77 by substantially 90 degrees. A voltage drop is also produced across inductor 79 as represented by vector 93 which leads the voltage across resistor 77 by substantially 90 degrees. The sum of the voltage drops across inductor 79, resistor 77 and capacitor 75 add up vectorially to equal the oscillator voltage vector 87 between the plate of tube 73 and ground as is seen from an inspection of the vector diagram.

The oscillator voltage across inductor 79 as represented by vector 93 is applied between the grid of tube 73 and ground, and leads the plate-ground voltage as represented by vector 87 by more than 90 degrees but appreciably less than 180 degrees. The capacitor 85 and resistor 83 in the cathode circuit of tube 73 cause an oscillator voltage drop to be produced between the cathode of tube 73 at point K'' and ground, as indicated by vector 95. If the relative values of the resistor 83 and the capacitor 85 in the cathode circuit of tube 73 are properly chosen, the resultant grid-cathode and the resultant plate-cathode oscillator voltages as indicated by vectors 97 and 99, respectively, will be 180 degrees out of phase at the oscillator frequency.

Although various types of phase-shift networks in the plate circuit of several phase-shift oscillators have been shown and described, and particular values for circuit components of a phase-shift oscillator in accordance with one embodiment of the present invention have been given for a particular oscillator operated at one frequency, it is understood that this has been done only for illustrating the principles of the present invention and providing an actual working embodiment thereof.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A phase-shift oscillator, comprising an amplifier tube including a cathode, a grid and a plate, phase-shift means in the plate circuit of said tube, said phase-shift means being connected to said plate and said grid for shifting the phase of an oscillator voltage component at said plate by a predetermined amount which is appreciably less than 180 degrees at a predetermined frequency, and reactive impedance means coupled to said cathode to provide an oscillator voltage drop of predetermined magnitude and phase angle thereacross at said frequency, said phase-shift means and said reactive impedance means comprising means for establishing substantially a 180 degree phase difference between grid-cathode and plate-cathode oscillator voltages at said frequency.

2. A phase-shift oscillator as set forth in claim 1, wherein said phase-shift means comprises first and second resistor-reactor L-section phase-shift stages.

3. A phase-shift oscillator as set forth in claim 2, wherein a capacitor forms one arm of each L-section phase-shift stage.

4. A phase-shift oscillator as set forth in claim 3, wherein the capacitor of each L-section phase-shift stage is effectively in series between said plate and said grid of said amplifier tube, and wherein said reactive impedance means coupled to said cathode comprises a capacitor.

5. A phase-shift oscillator as set forth in claim 1, wherein said phase-shift means comprises a resistor-reactor network, the resistance of said network being effectively in series between said plate and said grid of said amplifier tube with the reactance of said network being effectively in shunt, and wherein said reactive impedance means coupled to said cathode comprises an inductor.

6. A phase-shift oscillator, comprising a vacuum tube amplifier including a cathode, a grid and a plate, an oscillator voltage feedback network coupled between said plate and said grid, said feedback network being comprised of resistor-reactor phase-shift means for producing appreciably less than 180 degrees of phase difference between plate-ground and grid-ground oscillator voltages at a predetermined frequency, and reactive impedance means coupled between said cathode and ground to provide an oscillator voltage drop of predetermined magnitude and phase angle thereacross at said frequency, said resistor-reactor phase-shift means and said reactive impedance means comprising means for establishing substantially 180 degrees of phase difference between grid-cathode and plate-cathode oscillator voltages.

7. A phase-shift oscillator as defined in claim 6, wherein said resistor-reactor phase-shift means consists solely of first and second L-section resistor-reactor phase shift stages coupled between said plate and said grid of said vacuum tube amplifier.

8. A phase-shift oscillator as set forth in claim 7, wherein each reactor of said phase-shift stages comprises a capacitor.

9. A phase-shift oscillator, comprising an amplifier tube including a cathode, a grid, and a plate, a resistor-reactor phase-shift network, said network having an input terminal, an output terminal, and a ground terminal, said input terminal being coupled to said plate, said output terminal being coupled to said grid, said phase-shift network comprising means for providing a phase angle of appreciably less than 180 degrees between plate-ground and grid-ground oscillator voltages at a predetermined frequency, and reactive impedance means coupled between said cathode and ground to provide an oscillator voltage drop of predetermined magnitude and phase angle thereacross at said frequency, the resultant grid-cathode oscillator voltage being substantially 180 degrees out of phase with the resultant plate-cathode oscillator voltage.

10. A phase-shift oscillator as set forth in claim 9, wherein said phase-shift network comprises two L-section resistor-capacitor phase-shift stages.

11. A phase shift oscillator, comprising an amplifier tube including a cathode, a grid, and a plate, a load resistor coupled to said plate, first and second resistor-capacitor L-section phase shift stages coupled between said plate and said grid, the capacitors of said stages being in series between said plate and said grid, the resistors of said stages being shunted to ground, the phase angle between the oscillator voltage between said plate and ground and the oscillator voltage between said grid and ground as a result of said phase shift stages being substantially larger than 90 degrees and appreciably less than 180 degrees at a predetermined frequency, a biasing resistor coupled between said cathode and ground, and a capacitor in parallel with said resistor, the reactance of said capacitor being of a predetermined value at said frequency to provide an oscillator voltage drop of predetermined magnitude and phase angle between said cathode and ground so that the resultant grid-cathode oscillator voltage is substantially 180 degrees out of phase with the resultant plate-cathode oscillator voltage at said frequency.

References Cited in the file of this patent

UNITED STATES PATENTS 2,568,533 Artzt ---------------- Sept. 18, 1951